United States Patent Office 3,629,209
Patented Dec. 21, 1971

3,629,209
INTERPOLYMERS OF ETHYLENE AND ACRYLAMIDES
David W. McDonald, Ladue, Mo., and George A. Mortimer, La Marque, Tex., assignors to Monsanto Company, St. Louis, Mo.
No Drawing. Continuation of application Ser. No. 458,365, May 24, 1965, which is a continuation-in-part of application Ser. No. 390,177, Aug. 17, 1964, both now abandoned. This application Aug. 28, 1968, Ser. No. 755,836
Int. Cl. C08f 15/04
U.S. Cl. 260—80.73         3 Claims

ABSTRACT OF THE DISCLOSURE

Hard, tough, transparent interpolymers of ethylene consisting essentially of 99.5 to 75 mol percent of ethylene and from about 0.5 to about 25.0 mol percent of a compound selected from the group consisting of N-ispropylacrylamide, N-tert-butylacrylamide and mixtures thereof.

---

This application is a continuation of application Ser. No. 458,365 filed May 24, 1965, now abandoned which is a continuation-in-part of application Ser. No. 390,177, filed Aug. 17, 1964 and now abandoned.

The present invention relates to new polymeric composition and, more particularly, to interpolymers of ethylene with polymerizable unsubstituted and substituted acrylamides and methacrylamides and to a method for their preparation.

High-molecular-weight solid polymers of ethylene are well known in the art. These polymers have a wide range of physical characteristics and chemical properties which make them useful for many purposes. They can be produced by subjecting ethylene to polymerization at elevated pressures from 5,000 to 60,000 p.s.i.g. and elevated temperatures from 100° to 400° C. in the presence of free-radical initiators for the polymerization reaction. The properties of the polymers can be "tailored," so to speak, to a degree by varying polymerization conditions, using different initiators, etc. Variation in polymer properties such as density, molecular weight, melt index, tensile strength, stiffness and surface appearance can also be obtained by the use of compounds known as "modifiers" in the polymerization reaction and/or by polymerizing the ethylene with small amounts of comonomers. It has been proposed heretofore, for example, to polymerize ethylene in admixture with compounds containing one or more double bonds but the resulting products in many instances have been low-molecular-weight products unsuitable for the production of self-supporting films or shock-resistant molded objects such as bottles or the like because of their lack of the requisite toughness. In other instances, certain comonomers have resulted in improved toughness but adversely affected stiffness of the polymer product.

It is, accordingly, an object of the present invention to provide novel, solid polymers of ethylene with a high degree of toughness. Another object of the invention is to provide interpolymers of ethylene characterized by high toughness and having a stiffness essentially the same as that of polyethylene made under the same conditions. Still another object of the invention is to provide stiff, tough interpolymers of ethylene which are characterized by high transparency and are eminently suitable for use in the production of bottles, films and molded objects.

These and other objects and advantages of the invention which will become apparent from the following description thereof are accomplished by interpolymerizing ethylene and a compound represented by the following formula

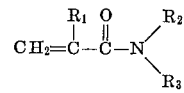

wherein $R_1$ is hydrogen or a methyl radical and $R_2$ and $R_3$ can be hydrogen or alkyl, aryl, hydroxyalkyl, cyanoalkyl, or hydroxyl-terminated polyethlene oxide radicals or a mixture of such compounds at elevated temperatures and pressures in the presence of a free-radical initiator for the polymerization.

As examples of compounds which can be interpolymerized with ethylene to produce the novel and improved polymers of the invention there may be listed acrylamide, N-isopropylacrylamide, N-tert-butylacrylamide, N-methylacrylamide, N-ethylacrylamide, N-tert-amylacrylamide, N-tertoctylacrylamide, N,N-dimethylacrylamide, N,N-diethylacrylamide, N,N-dipropylacrylamide, N-cyanoethylacrylamide, N-hydroxymethylacrylamide, N-phenylacrylamide, N - tolylacrylamide, N-2-(2-ethoxy)-ethoxyethylacrylamide, and methacrylamide and its N-methyl-, N-ethyl-, N-propyl-, N-isopropyl-, N-butyl, N-amyl-, N-cyanomethyl-, N-cyanoethyl-, N-cyanopropyl, N-hydroxymethyl, N-hydroxethyl-, N-hydroxypropyl-, N-hydroxybutyl, N-phenyl-, N-tolyl-, N,N-dimethyl-, N,N-diethyl-, N,N-dipropyl-, N,N-diisopropyl-, N-2-(2-methoxy)-ethoxyethyl- and the like derivatives.

In general, the interpolymers of the invention may contain from as little as 0.5 mol percent to as much as 95 mol percent of the unsaturated amide comonomer or comonomers. The more desirable interpolymer compositions are those containing less than 50 mol percent of the specified amides. Depending upon their particular end use, interpolymers containing from 0.5 to 25 mol percent of the unsaturated amide constituent are preferred while those having from about 0.5 to about 10 mol percent are especially preferred in view of certain outstanding properties they exhibit.

The polymerization process by which the interpolymers are produced is conducted at superatmospheric pressures from about 5,000 p.si.g. up to as high as 60,000 p.s.i.g. Preferably, the pressures employed are in the range from about 20,000 to about 35,000 p.s.i.g.

While the temperature of the polymerization process may be varied over the range from about 100° to about 400° C, preferred temperatures are those from about 130° to about 300° C.

Any of the well known free-radical iniators used for catalyzing the polymerization of ethylene can be employed for producing the novel interpolymers herein described. Among these may be mentioned molecular oxygen; per-oxygen type compounds such as hydrogen peroxide, dialkyl dioxides such as diethyl peroxide and di-tert-butyl peroxide, diaryl peroxides such as lauroyl peroxide and benzoyl peroxide, alkyl hydroperoxides such as tert-butyl hydroperoxide, diperoxy dicarbonate esters such as diisopropylperoxy dicarbonate, tert-alkyl percarboxylates such as tert-butylperbenzoate, persulfates such as potassium persulfate, peracids such as peracetic acid and the like; azo-type compounds such as azo-bis (isobutylronitrile); azines such as benzalazines; oximes such as acetone oxime; etc. The initiators may be used alone or in any combination. Particularly suitable are peroxides such as di-tert-butyl peroxide, for example. Only small amounts of the initiator are required. Generally, initiator concentration will vary from about 0.0005% to about 2% of the total weight of the monomers charged to the polymerization reactor.

So-called polymerization "modifiers" or chain-transfer agents can also be employed in the manufacture of the interpolymers of the invention, if desired, to obtain certain polymer properties which such modifiers or chain-transfer agents may impart. Examples of compounds in general used in the art for this purpose are aliphatic alcohols containing one to ten carbon atoms and preferably three to five carbon atoms such as methanol, propanol, isobutanol, hexanol and decanol; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as formaldehyde, acetaldehyde, butyraldehyde and the like; saturated hydrocarbons such as ethane, propane, cyclohexane and the like; aromatic hydrocarbons such as toluene, xylene and the like; chlorinated hydrocarbons such as chloroform, carbon tetrachloride and the like; and hydrogen.

The polymerization process may be either a batch or a continuous one. The preferred method is the continuous type of operation wherein ethylene, the amide comonomer or comonomers, initiator or initiators, and modifiers, if one or more are used, are charged to a reactor maintained under suitable conditions of temperature and pressure, interpolymer is continuously separated from the reactor effluent, and unreacted monomers, initiators, and modifiers, if any, may be recycled to the reactor.

The invention is illustrated in the following examples which, however, are not to be construed as limiting it in any manner whatsover. All percentages given therein are on a molar basis unless otherwise indicated.

EXAMPLE 1

A series of experiments were conducted in which ethylene together with small amounts of acrylamide or an N-substituted acrylamide was polymerized. In each experiment, a steel reaction bomb together with all accessory lines thereto was carefully cleaned and flushed with ethylene to eliminate all traces of air or oxygen. The normally gaseous feed materials, i.e., ethylene and propane used as a modifier, were introduced into the reaction chamber of the bomb heated to the reaction temperature of 130° C. at atmospheric pressure until the pressure increased to about 700 p.s.i. Thereafter, additional hot ethylene was pumped into the bomb until the pressure reached about 7500 p.s.i. at the temperature level of 130° C. Then the mechanical agitator inside the bomb was activated and the normally liquid feeds, i.e., the comonomer dissolved in a suitable solvent such as methanol, for example, and di-tert-butyl peroxide initiator dissolved in benzene, were forced from a small cold compartment of the bomb where they had been stored free of air or oxygen contamination into the reaction chamber by means of high pressure ethylene charged until a final pressure of 20,000 p.s.i. at 130° C. was attained. After the desired reaction time, the bomb was depressurized and the polymer product was recovered and its physical properties determined.

A summary of reaction conditions for the various runs made is presented in Table I below and the physical properties determined for the interpolymers produced under these conditions are presented in Table II. The methods used for the determination of melt index and density are described in J. App. Polymer Sci., 8, 839 (1964) and J. Polymer Sci., A–2, 1301 (1964), respectively. All other evaluations were performed on nominally 20-mil thick specimens. A standard procedure, ASTM D–1822 61 T, was followed for the tensile impact test using the "S" specimen. The "L" specimen was used for slow speed testing. It was pulled at 2 in./min. in an Instron tensile testing machine until the sample failed. From the force curve, the modulus (5% secant or extrapolated to 5% if yield occurred prior to 5%), tensile at yield, and tensile at fail were calculated based on the dimensions of the unextended specimen. Solvent resistance was measured as percent weight gain after standing in toluene or isooctane at room temperature for 48 hours, a modification of ASTM D–471 59 T.

In Table II, there are included for comparative purposes similar sets of physical data for two polyethylene samples (Runs 13 and 14) made under analogous conditions using the same experimental procedure. The polymer in Run 13 was made at 150° C. and 20,000 p.s.i. over a period of 49 min. using 0.023 millimole per liter of di-tert-butyl peroxide as initiator and 11.14% propane as a modifier, while that in Run 14 was produced at 20,000 p.s.i. and 210° C. over a reaction period of 38 min. with 0.207 millimole per liter of azoisopropane as initiator and 1.2% cyclohexane plus 0.03% toluene as modifiers.

TABLE I

| Run No. | Initiator conc. (mmol/li.) | $C_2H_4$, percent | $C_3H_8$, percent | $C_6H_6$, percent | Comonomer | Percent | Solvent for comonomer | Percent | Reaction time (min.) | Conversion (wt. percent) |
|---|---|---|---|---|---|---|---|---|---|---|
| 1 | 1.03 | 84.83 | 10.95 | 0.25 | Acrylamide | 0.14 | Methyl formate | 3.82 | 28 | 10.7 |
| 2 | 1.03 | 82.57 | 11.22 | 0.25 | do | 0.70 | Methanol | 5.24 | 40 | 10.7 |
| 3 | 1.03 | 86.45 | 0 | 0.12 | do | 0.21 | do | 13.22 | 36 | 6.8 |
| 4 | 0.413 | 84.76 | 14.43 | 0.71 | N-isopropylacrylamide | 0.10 | Benzene | | 33 | 10.1 |
| 5 | 0.413 | 82.86 | 14.43 | 2.30 | do | 0.42 | do | | 68 | 6.9 |
| 6 | 0.413 | 83.87 | 14.43 | 1.45 | do | 0.25 | do | | 29 | 5.0 |
| 7 | 0.413 | 82.44 | 14.43 | 0.18 | N-tert-butylacrylamide | 0.22 | Methanol | 2.73 | 21 | 7.0 |
| 8 | 0.207 | 83.94 | 14.43 | 0.16 | do | 0.11 | do | 1.37 | 45 | 10.1 |
| 9 | 0.413 | 85.41 | 14.32 | 0.18 | N-methylacrylamide | 0.086 | None | | 61 | 5.1 |
| 10 | 0.413 | 83.87 | 14.43 | 0.18 | N-phenylacrylamide | 0.096 | Methanol | 1.43 | 81 | 8.7 |
| 11 | 0.620 | 82.32 | 14.43 | 0.20 | do | 0.19 | do | 28.5 | 92 | 6.8 |
| 12 | 0.826 | 81.12 | 12.56 | 0.23 | do | 0.38 | do | 5.71 | 150 | 8.6 |

TABLE II

| Polymer Run No. | Comonomer in polymer, percent | Melt index (dg./min.) | Modulus (p.s.i.) | Density (g./cc.) | Tensile at yield (p.s.i.) | Tensile at fail (p.s.i.) | Tensile impact (ft. lb./sq. in.) | Percent weight gain in isooctane |
|---|---|---|---|---|---|---|---|---|
| 1 | 0.9 | 3.79 | 1,320 | 0.940 | 1,940 | 2,320 | 67 | 4.7 |
| 2 | 1.3 | 0.982 | 1,790 | 0.939 | 1,900 | 2,950 | 93 | 5.0 |
| 3 | 2.4 | 0.0347 | 1,550 | 0.939 | 1,690 | 4,450 | 489 | 4.8 |
| 4 | 0.95 | 0.457 | 1,620 | 0.932 | 1,730 | 3,530 | 129 | 5.6 |
| 5 | 4.3 | 1.76 | 1,980 | 0.934 | 2,000 | 4,040 | 252 | 8.4 |
| 6 | 3.9 | 1.74 | 1,890 | 0.931 | 1,910 | 5,150 | 445 | 7.1 |
| 7 | 2.1 | 4.07 | 1,360 | 0.932 | 1,440 | 3,960 | 280 | 7.7 |
| 8 | 0.6 | 1.39 | 1,740 | 0.934 | 1,880 | 3,820 | 125 | 5.4 |
| 9 | 1.0 | 2.02 | 1,860 | 0.934 | 2,060 | 3,220 | 97 | |
| 10 | 1.6 | 1.89 | 1,750 | 0.941 | 1,990 | 3,120 | 105 | |
| 11 | 2.5 | 4.37 | 1,890 | 0.952 | 2,160 | 3,070 | 110 | |
| 12 | 3.1 | 4.62 | 2,000 | 0.955 | 2,210 | 2,970 | 97 | |
| 13 | 0 | 1.09 | 1,750 | 0.931 | 2,030 | 2,370 | 84 | 5.3 |
| 14 | 0 | 0.0370 | 1,100 | 0.921 | 1,390 | 3,750 | 467 | 6.9 |

EXAMPLE 2

About 94.32% of ethylene and 0.23% of N-isopropylacrylamide dissolved in 1.17% benzene were copolymerized in the manner described in Example 1 under the same pressure conditions but at a temperature of 219° C. using oxygen as initiator for the polymerization reaction. The oxygen gas in an amount of 0.101 millimole (mmol) per liter of reaction volume was fed to the reaction with the 4.28% of propane employed as a modifier. After a reaction period of approximately one hour, the copolymer product was recovered and evaluated. The copolymer containing 2.1% of N-isopropylacrylamide had the following physical properties:

Melt Index—8.39 dg./min.
Modulus—1550 p.s.i.
Density—0.925 g./cc.
Tensile at yield—1750 p.s.i.
Tensile at fail—3410 p.s.i.
Tensile impact—216 ft. lb./sq. in.

EXAMPLE 3

A copolymer containing 97.2% of ethylene and 2.8% of N-isopropylacrylamide having a density of 0.930 was prepared according to the procedure of Example 1 by polymerizing 85.75% ethylene with 0.24% of N-isopropylacrylamide in the presence of 12.66% propane as a modifier and 0.052 mmol per liter of azobisisobutanol diacetate dissolved in 1.36% benzene as the initiator, at a temperature of 168° C. and a pressure of 30,000 p.s.i.

EXAMPLE 4

Following essentially the same procedure employed in Example 1 and using the same conditions of temperature and pressure, ethylene and N-hydroxymethylacrylamide were copolymerized. In one run (A), the feeds to the reactor consisted of 84.65% ethylene, 0.16% N-hydroxymethylacrylamide dissolved in 0.59% water, 14.43% propane and 0.413 mmol per liter of di-tert-butyl peroxide dissolved in 0.18% benzene. In the second run (B), 83.90% ethylene, 0.31% N-hydroxymethylacrylamide in 1.18% water, 14.43% propane, and 0.413, mmol per liter of di-tert-butyl peroxide in 0.18% benzene were charged to the reactor. The resulting copolymers had the following properties:

|  | Run A | Run B |
|---|---|---|
| Composition: |  |  |
| Percent ethylene | 99.4 | 99.2 |
| Percent N-hydroxymethylacrylamide | 0.6 | 0.8 |
| Melt index, dg./min. | 1.05 | 0.410 |
| Modulus, p.s.i. | 2,000 | 1,990 |
| Density, g./cc. | 0.937 | 0.938 |
| Tensile at yield, p.s.i. | 2,610 | 2,110 |
| Tensile at fail, p.s.i. | 3,000 | 2,380 |
| Tensile impact, ft. lb./sq. in. | 59 | 40 |

EXAMPLE 5

Ethylene (85.29%) and N,N-dimethylmethacrylamide (0.098%) were copolymerized in the presence of 14.43% propane and 0.413 mmol per liter of di-tert-butyl peroxide dissolved in 0.18% benzene according to the procedure and under the conditions described in Example 1. The copolymer product containing 99.4% ethylene and 0.6% N,N-dimethylmethacrylamide was evaluated and found to have the following properties:

Melt Index, dg./min.—1.02
Modulus, p.s.i.—2010
Density, g./cc.—0.935
Tensile at yield, p.s.i.—2170
Tensile at fail, p.s.i.—3490
Tensile Impact, ft. lb./sq. in.—97

EXAMPLE 6

Following the procedure described in Example 1 and using essentially the same conditions of temperature and pressure, 14.43% of propane as a modifier, and the indicated concentrations of initiator and methanol (comonomer solvent), copolymers of the following composition were prepared by varying the amount of ethylene and N-isopropylacrylamide (N-IPA) charged to the reactor.

|  | Polymer composition | | Initiator conc., mmol/li. | Methanol, percent |
|---|---|---|---|---|
|  | $C_2H_4$, percent | N-IPA, percent |  |  |
| Polymer: |  |  |  |  |
| A | 79.9 | 20.1 | 0.413 |  |
| B | 81.2 | 18.8 | 0.620 | 3.16 |
| C | 83.9 | 16.1 | 0.413 |  |
| D | 88.4 | 11.6 | 0.413 | 2.11 |

These copolymers were all characterized by a stiffness far superior to that of polyethylene and comparable to or better than that of the copolymers described in the previous examples which contained lesser amounts of the N-isopropylacrylamide component.

EXAMPLE 7

The steel reaction bomb of Example 1 was used as the reactor for preparing a series of copolymers of ethylene and N-isopropylacrylamide (N-IPA) by a polymerization procedure modified somewhat from the one described in that example. A weighed amount of solid N-isopropylacrylamide was dissolved in ethyl acetate and the solution was aspirated into the unheated bomb which had previously been evacuated. A vacuum was again drawn on the reactor to flush it together with all accessory lines with solvent vapor and remove any air present. Ethylene-$C^{14}$ was admitted to the reactor from a tared pressure vessel in a manner to exclude air. Based on the weight loss of the tared vessel and the weight of N-isopropylacrylamide, the monomer charge was calculated. The mechanical agitator inside the reactor was activated and the reactor was heated to 130° C. with circulating hot oil. Di-tert-butyl peroxide in an amount equivalent to $2.15 \times 10^{-3}$ moles/liter of reactor volume was forced from a small cold compartment of the bomb where it had been stored free of air or oxygen contamination into the reactor and the pressure was raised to 20,000 p.s.i. by pumping ethyl acetate through the compartment into the reactor. After 45 minutes, the pressure was carefully released and the ethyl acetate solution was recovered from the reactor. The solution was concentrated under reduced pressure and poured into n-hexane to precipitate the polymer. The polymer was recovered by filtration and dried under vacuum at 60° C. Conversion was calculated and the composition of the copolymer was determined by scintillation counting of a portion reprecipitated to constant activity. Compositions of the polymers obtained are tabulated below along with the feed compositions, reaction times, and conversions.

| Run No. | Feed composition | | Time (min.) | Conversion (weight percent) | Polymer composition | |
|---|---|---|---|---|---|---|
|  | Percent $C_2H_4$ | Percent N-IPA |  |  | Percent $C_2H_4$ | Percent N-IPA |
| 101 | 92.5 | 7.5 | 55 | 3.1 | 36.2 | 63.8 |
| 102 | 80.5 | 19.5 | 65 | 3.2 | 18.4 | 81.6 |
| 103 | 66.9 | 33.1 | 50 | 6.0 | 11.1 | 88.9 |
| 104 | 64.2 | 35.8 | 37 | 11.5 | 10.4 | 89.6 |
| 105* | 54.8 | 45.2 | 55 | 0.3 | 8.1 | 91.9 |
| 106 | 54.8 | 45.2 | 38 | 0.6 | 8.1 | 91.9 |

*Amount of initiator, ½ that of other runs.

EXAMPLE 8

Following the procedure described in Example 1 and using essentially the same conditions of temperature and pressure, propane as a modifier, di-tert-butyl peroxide as initiator, and methanol as a solvent for the amine comonomers, interpolymers of ethylene and a mixture of unsaturated amide comonomers were prepared and evaluated. A summary of the reaction conditions used and the properties determined for the transparent interpolymers made is presented in Tables III and IV below.

TABLE III

| Run No. | Initiator conc. mmol/li | Feed composition | | | | | | | Reaction time, min. | Conversion, weight percent |
|---|---|---|---|---|---|---|---|---|---|---|
| | | $C_2H_4$, percent | $C_3H_8$, percent | $C_6H_6$, Percent | Comonomers | Percent | Solvent for co-monomers | percent | | |
| 107 | 0.413 | 84.48 | 12.82 | 0.18 | N-IPA and N-tert-butyl acrylamide | 0.17; 0.15 | Methanol | 2.21 | 57 | 8.0 |
| 108 | 0.620 | 83.57 | 14.43 | 0.20 | N-IPA and acrylamide | 0.21; 0.20 | ___do___ | 1.39 | 47 | 6.4 |
| 109 | 0.620 | 84.34 | 14.43 | 0.20 | N-IPA and N,N-dimethylmethacrylamide. | 0.21; 0.29 | ___do___ | 0.53 | 70 | 4.1 |

TABLE IV

| Run No. | Polymer composition | | | | | | | | | |
|---|---|---|---|---|---|---|---|---|---|---|
| | First comonomer | Percent | Second comonomer | percent | $C_2H_4$, percent | Melt index, dg./min. | Modulus, p.s.i. | Density, g./cc. | Tensile at yield, p.s.i. | Tensile at fail, p.s.i. | Tensile impact, ft.lb./sq. in |
| 107 | N-IPA | 1.7 | N-tertbutyl acrylamide | 2.1 | 9.61 | 2.05 | 2,830 | 0.931 | 1,800 | 4,620 | 373 |
| 108 | N-IPA | 1.9 | Acrylamide | 0.5 | 97.6 | 1.88 | 1,670 | 0.934 | 1,730 | 3,960 | 218 |
| 109 | N-IPA | 2.9 | N,N-dimethylmethacrylamide | 1.4 | 95.7 | 6.93 | 1,320 | 0.936 | 1,590 | 4,150 | 295 |

EXAMPLE 9

Another group of interpolymers of ethylene and N-isopropylacrylamide (N-IPA) was prepared on a pilot-plant scale in a continuous operation using an 8-mm. jacketed tubular reactor. Pure ethylene was compressed to approximately 1200 p.s.i. and mixed with a methanol-isopropanol stream containing dissolved benzoyl peroxide as initiator and the N-isopropylacrylamide comonomer. The mixed stream was then compressed to 35,000 p.s.i. and introduced into the heated reactor where the polymerization occurred. Peak temperatures in the reactor were in the range from about 150 to 225° C. At the completion of the polymerization reaction, the pressure was reduced to approximately 1400 p.s.i. and the reaction effluent was discharged into a separator. Unreacted ethylene and N-isopropylacrylamide were removed from the top of the separator while molten polymer was transferred from the bottom of the separator into water-cooled trays. The polymer was permitted to solidify after which it was chopped into granular form. Reaction conditions under which the various polymers were produced and the composition of the polymers are recorded in Table V below. The concentrations of ethylene and N-isopropylacrylamide given in this instance are expressed as percent of total monomers while that of the methanol-isopropanol stream is expressed as percent of total feed. Properties of the polymers as determined on the crude samples are summarized in Table VI.

EXAMPLE 10

A copolymer of ethylene and N,N-dicyanoethylacrylamide having a melt index of 5.0 dg./min. tensile at yield of 1670 p.s.i. modulus of 1350 p.s.i., tensile at fail of 5500 p.s.i., and tensile impact of 450 ft. lb./sq. in. is produced by polymerizing ethylene with 0.15% N,N-dicyanoethylacrylamide at 29,500 p.s.i. and 132° C. in the presence of 2.95% acetone and 0.207 mmol/liter of di-tert-butyl peroxide following the general procedure described in Example 1.

As indicated by the foregoing data, the interpolymers of the present invention possess certain characteristics not to be found in standard or conventional ethylene polymers. For example, the ethylene-acrylamide copolymers swell less in isooctane and thus have increased resistance to aliphatic hydrocarbons; the ethylene-N-tert-butylacrylamide copolymers show increased values for tensile at fail and tensile impact indicative of greater toughness; and the ethylene-N-isopropylacrylamide copolymers, while exhibiting a similar improvement in toughness in general over conventional polyethylenes of comparable melt index, also are much more easily processed in molding and film-forming operations because copolymers having a higher melt-index can be produced which are still characterized by higher tensile at fail and equivalent tensile impact relative to polyethylenes of lower melt index. These latter copolymers are particularly outstanding materials because in addition to their high degree of toughness, they are transparent which makes them highly suitable for fabricating into articles such as bottles, containers, etc., and films for bags and the like. Notable, also, is the fact that both the improved toughness and/or clarity of certain of the copolymers are obtained with no significant loss in stiffness as indicated by their modulus values. Copolymers of ethylene in the art having comparable toughness and/or clarity are usually characterized by an accompanying decreased stiffness.

The interpolymers of the invention may be blended with other thermoplastic polymers. Fillers, reinforcing

TABLE V

| Run No. | Initiator conc., p.p.m. | Feed composition | | | | Product composition | |
|---|---|---|---|---|---|---|---|
| | | $C_2H_4$, percent | N-IPA, percent | $CH_3OH$-Iso$C_3H_7OH$, | percent | $C_2H_4$, percent | N-IPA, percent |
| T-9 | 8.2 | 99.63 | 0.37 | 2.1 | 2.6 | 97.3 | 2.7 |
| T-10 | 8.1 | 99.02 | 0.98 | 1.74 | 2.8 | 74.9 | 25.1 |
| T-11 | 6.2 | 99.33 | 0.67 | 1.85 | 2.9 | 89.0 | 11.0 |
| T-12 | 6.9 | 99.28 | 0.72 | 4.7 | 1.1 | 94.0 | 6.0 |
| T-14 | 12 | 99.03 | 0.97 | 1.4 | 3.0 | 93.0 | 7.0 |
| T-15 | 11.6 | 99.07 | 0093 | 1.4 | 2.8 | 93.7 | 6.3 |
| T-16 | 9.5 | 99.15 | 0.85 | 1.7 | 3.4 | 93.8 | 6.2 |
| T-17 | 6.2 | 99.33 | 0.67 | 1.85 | 2.9 | 87.6 | 12.4 |
| T-18 | 8.8 | 100 | 0 | 0 | 3.2 | 100 | |
| T-19 | 8.6 | 100 | 0 | 3.8 | 1.7 | 100 | |

TABLE VI

| Run No. | Melt index, dg./min. | Modulus, p.s.i. | Tensile at yield, p.s.i. | Tensile at fail, p.s.i. | Tensile impact, ft. lb./sq. in. |
|---|---|---|---|---|---|
| T-9 | 8.3 | 2,190 | 1,720 | 3,130 | 120 |
| T-10 | 1.64 | 5,960 | 4,700 | 5,630 | 84 |
| T-11 | 1.52 | 3,100 | 2,750 | 4,520 | 75 |
| T-12 | 0.55 | 2,000 | 2,055 | 4,630 | 288 |
| T-14 | 3.6 | 1,700 | 1,750 | 3,160 | 163 |
| T-15 | 4.45 | 2,430 | 2,150 | 3,530 | 140 |
| T-16 | 25 | 1,670 | 1,710 | 2,380 | 69.4 |
| T-17 | 0.39 | 1,740 | 1,550 | 2,200 | 59.4 |
| T-18 | 5.4 | 2,230 | 2,040 | 1,730 | 34 |
| T-19 | 0.9 | 1,960 | 1,980 | 2,860 | 62 | agents, such as fibrous materials, and foaming agents may be added to the interpolymers to render them suitable for particular applications. The properties of the interpolymers can be preserved or enhanced by the addition of stabilizing agents, and pigments may be added to the interpolymers to obtain colored compositions.

What is claimed is:

1. Hard, transparent interpolymers of ethylene consisting essentially of from about 99.5 mol percent to about 75 mol percent of ethylene and from about 0.5 mol percent to about 25.0 mol percent of a monomeric compound selected from the group consisting of N-isopropylacrylamide and a mixture of N-isopropylacrylamide and N-tert-butylacrylamide, said interpolymers being characterized by a high degree of toughness as evidenced by an ultimate tensile strength measured by tensile-at-fail values of at least 2200 p.s.i. and tensile impact values of at least 62 ft. lb./sq. in. and a stiffness as measured by modulus values of at least 1360 p.s.i.

2. The interpolymers of claim 1 wherein said monomeric compound is N-isopropylacrylamide.

3. The interpolymers of claim 1 wherein said monomeric compound is a mixture of N-isopropylacrylamide and N-tert-butylacrylamide.

References Cited

UNITED STATES PATENTS

| | | | |
|---|---|---|---|
| 2,388,225 | 10/1945 | Brooks et al. | 260—88.1 |
| 2,650,913 | 9/1953 | Boyd | 260—88.1 |
| 2,992,943 | 7/1961 | Coover et al. | 117—139.5 |
| 3,112,296 | 11/1963 | Maeder | 260—80.73 |

HARRY WONG, JR., Primary Examiner

U.S. Cl. X.R.

260—85.5 A, 88.1, 897

PO-1050
(5/69)

UNITED STATES PATENT OFFICE
CERTIFICATE OF CORRECTION

Patent No. ___3,629,209___  Dated ___December 21, 1971___

Inventor(s) ___David W. McDonald et al___

It is certified that error appears in the above-identified patent and that said Letters Patent are hereby corrected as shown below:

In. Col. 1, ll. 28-29, for "composition" read -- compositions --.

In Col. 2, line 63, for "(isobutylronitrile)" read -- (isobutyronitrile) --.

In Table I, bridging Columns 3 & 4, Run No. 11, the Column headed "Solvent for Comonomer - Per cent", for "28.5" read -- 2.85 --.

In Table II, bridging Columns 3 & 4, Run No. 1, in the Column headed "Per cent weight gain in isooctane", for "47" read -- 4.7 --.

In Table II, bridging Columns 3 & 4, Run No. 13, in the Column headed "Tensile at fail, (p.s.i.)", for "2370" read -- 3370 --.

In Col. 5, line 8, for "reaction read -- reactor --.

In Col. 5, line 52, in the Column headed "Run A", for "2610" read -- 2160 --.

In Table IV, bridging Columns 7 & 8, Run No. 107 in the Column headed "Second comonomer", for "N-tertbutylacrylamide" read -- N-tert-butylacrylamide --.

In Table IV, bridging Columns 7 & 8, Run No. 107 in the Column headed "$C_2H_4$, per cent", for "9.61" read -- 96.1 --.

In Table V, bridging Columns 7 & 8, Run No. T-15 in the Column headed "N-IPA, per cent", for "0093" read -- 0.93 --.

Signed and sealed this 6th day of June 1972.

(SEAL)
Attest:

EDWARD M. FLETCHER, JR.
Attesting Officer

ROBERT GOTTSCHALK
Commissioner of Patents